(12) United States Patent
Samman (10) Patent No.: US 8,905,260 B2
(45) Date of Patent: Dec. 9, 2014

(54) PRESSURE VESSEL SKIRT FOR ACCOMMODATING THERMAL CYCLING

(71) Applicant: Houston Engineering Solutions, LLC, Houston, TX (US)

(72) Inventor: Mahmod Samman, Houston, TX (US)

(73) Assignee: Houston Engineering Solutions, LLC, Houston, TX (US)

( * ) Notice: Subject to any disclaimer, the term of this patent is extended or adjusted under 35 U.S.C. 154(b) by 20 days.

(21) Appl. No.: 13/674,418

(22) Filed: Nov. 12, 2012

(65) Prior Publication Data

US 2013/0284744 A1    Oct. 31, 2013

Related U.S. Application Data

(60) Provisional application No. 61/640,465, filed on Apr. 30, 2012.

(51) Int. Cl.
*F17C 1/02* (2006.01)

(52) U.S. Cl.
USPC ........... 220/634; 220/628; 220/630; 220/648; 220/480

(58) Field of Classification Search
CPC ................................ B65D 25/00; C10B 29/08
USPC ......... 220/408, 581, 628, 630, 647, 648, 646, 220/639, 634, 636, 638, 633, 480
See application file for complete search history.

(56) References Cited

U.S. PATENT DOCUMENTS

| | | | |
|---|---|---|---|
| 4,133,094 A | 1/1979 | Stafford | |
| 5,628,603 A | 5/1997 | Antalffy et al. | |
| 5,804,038 A | 9/1998 | Nelsen | |
| 6,206,059 B1 | 3/2001 | Maakad et al. | |
| 7,131,618 B2 * | 11/2006 | Berry et al. | 248/346.05 |
| 7,666,279 B2 | 2/2010 | Cihlar et al. | |
| 7,871,500 B2 | 1/2011 | Lah | |
| 8,440,057 B2 * | 5/2013 | Lah | 202/266 |
| 2009/0236212 A1 | 9/2009 | Lah | |

FOREIGN PATENT DOCUMENTS

WO    2011045843 A1    4/2011

* cited by examiner

*Primary Examiner* — Stephen Castellano
(74) *Attorney, Agent, or Firm* — Patterson & Sheridan, L.L.P.

(57) ABSTRACT

A pressure vessel includes: a body comprising a cylindrical section; and a skirt comprising a hip, a leg, and a restraint. The hip formed with or attached to the body and has a profile for receiving an upper portion of the leg. The profile is oversized relative to the leg upper portion, thereby defining a radial clearance between the hip and the leg to account for thermal cycling of the body. The restraint fastens the hip and the leg while allowing limited movement between the hip and the leg to account for the thermal cycling.

19 Claims, 6 Drawing Sheets

PRESSURE VESSEL SKIRT FOR ACCOMMODATING THERMAL CYCLING

BACKGROUND OF THE INVENTION

1. Field of the Invention

Embodiments of the present invention generally relate to a pressure vessel skirt for accommodating thermal cycling.

2. Description of the Related Art

Delayed petroleum coking is a process in which a petroleum fraction is heated to a temperature at which it thermally decomposes to provide a solid coke product and a hydrocarbon distillate product. In general, a liquid petroleum feed stock is first distilled until the lighter ends have been recovered and a heavy residuum remains. This heavy residuum of heated pitch and cat-cracked heavy or cycle oil is charged to the bottom of a structure called a coke drum.

Coke drums are vertically-disposed pressure vessels that are commonly twelve to thirty-two feet in diameter with a thirty to over eighty-feet tall cylindrical section. A coke drum typically has a conical bottom section to provide uniformity of support stresses in the structure, and is supported by a skirt that is welded to or near a transition knuckle between the cylindrical section and the conical bottom section.

In the coke drum, the heavy residuum is further heated to about one thousand degrees Fahrenheit and undergoes extensive and controlled cracking and coking under high-pressure conditions. A cracked lighter product rises to the top of the coke drum in a process called steam stripping and is drawn off.

A heavier product remains and cracks to coke, a solid, coal-like substance. The coke is usually purged with steam to remove any remaining volatile components. After the cracking and coking process is complete, quench water is introduced and high-pressure water jets are used to cut away and remove the coke. The water reduces the temperature in the drum to around two hundred degrees Fahrenheit or less before a new cycle begins. In order to increase production speed, the quenching operation is often done as quickly as possible. The cycle time for a vessel is typically 48 hours or less.

The heating and quenching cyclic operations of vessels such as coke drums cause deterioration of the structure over time. Vessels subjected to such extreme thermal cycling may experience a failure in the area where the support skirt is welded to the vessel shell. Cracking and structural failure of the support skirt, the vessel wall, and/or the attachment weld may occur.

A structure that is more resistant to cracking and other fatigue-related failures would be advantageous.

SUMMARY OF THE INVENTION

Embodiments of the present invention generally relate to a pressure vessel skirt for accommodating thermal cycling. In one embodiment, a pressure vessel includes: a body comprising a cylindrical section; and a skirt comprising a hip, a leg, and a restraint. The hip formed with or attached to the body and has a profile for receiving an upper portion of the leg. The profile is oversized relative to the leg upper portion, thereby defining a radial clearance between the hip and the leg to account for thermal cycling of the body. The restraint fastens the hip and the leg while allowing limited movement between the hip and the leg to account for the thermal cycling.

In another embodiment, a method for retrofitting a pressure vessel includes: severing a lower portion of a skirt of the pressure vessel from an upper portion of the skirt; fastening or welding an adapter to the severed lowered portion; and supporting the pressure vessel by engaging the adapter with a profile of the skirt upper portion.

In another embodiment, a method for retrofitting a pressure vessel includes: severing a lower portion of a skirt of the pressure vessel from an upper portion of the skirt; replacing the severed lowered portion with a leg having a diameter less than the severed lower portion; and supporting the pressure vessel by engaging the leg with a profile of the skirt upper portion

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
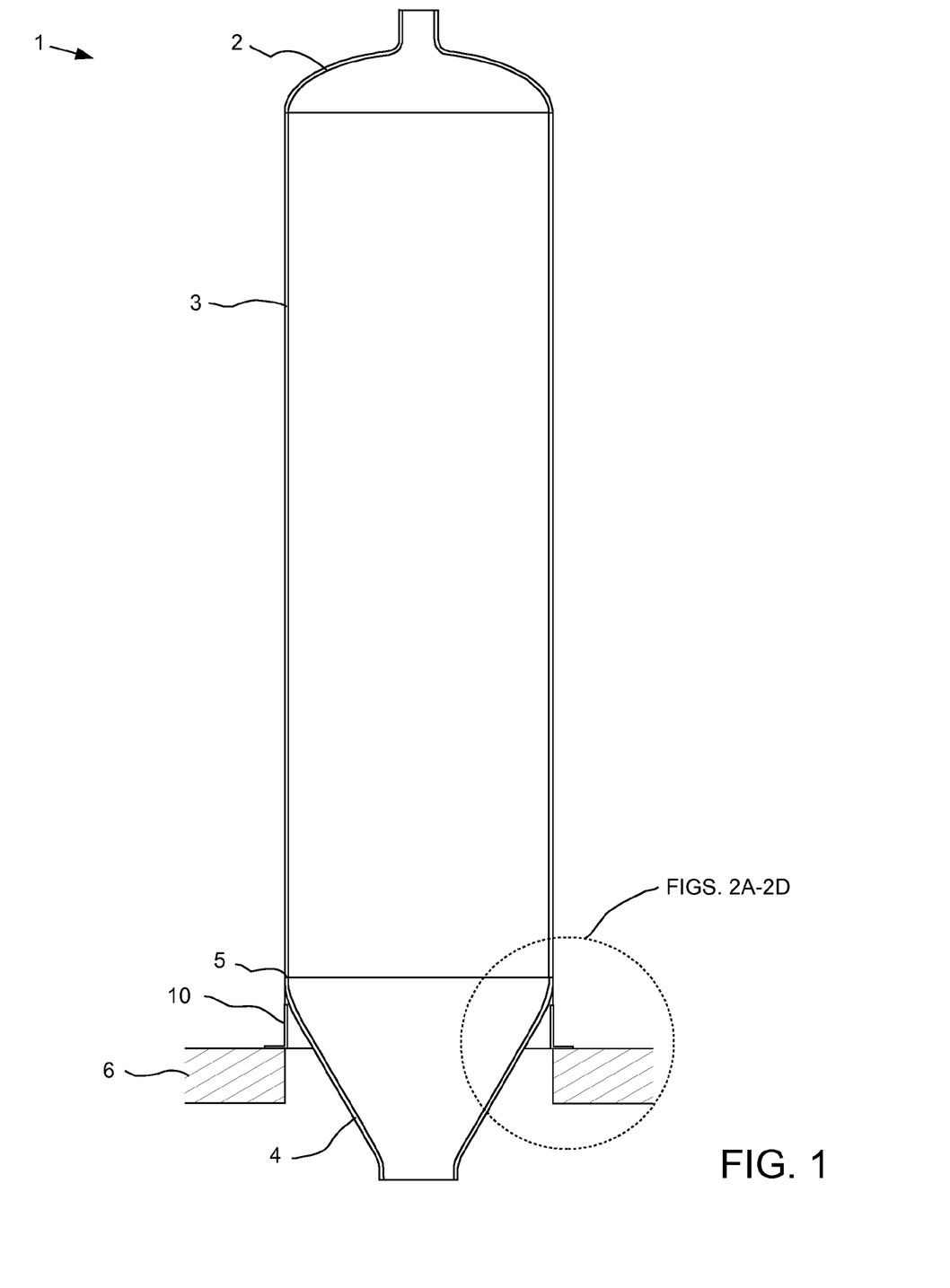
FIG. 1 illustrates a coke drum, according to one embodiment of the present invention.

FIG. 1 illustrates a coke drum 1, according to one embodiment of the present invention. The coke drum 1 may include a cap 2, a cylindrical section 3, a bottom 4, a skirt 10, an inlet, an outlet, and a utility port. A body 2-4 of the drum 1 and the skirt 10 may be made from a metal or alloy, such as steel. The steel may be plain carbon, low alloy, or stainless. Alternatively, the metal or alloy may be special, such as a high alloy steel, a nickel based alloy, aluminum, aluminum based alloy, titanium, or a titanium based alloy. The skirt 10 or one or more members thereof may be made from the same or different metal or alloy than the body 2-4. The coke drum 1 may be vertically oriented. The cap 2 and bottom 4 may each be welded or fastened to the cylindrical section 3. The cap 2 may be hemispherical, hemi-ellipsoidal, or torispherical. Alternatively, the cap 2 may be a blind flange. The bottom 4 may be conical or a polygonal approximation thereof.

Alternatively, the skirt 10 may be used with any other kind of pressure vessel subject to thermal cycling, such as a heat exchanger, boiler, or reactor. The pressure vessel may have a design pressure greater than, equal to, or less than fifteen pounds per square inch gage (psig). The pressure vessel may or may not be designed according to local jurisdictional code, such as ASME Section VIII. The pressure vessel may have two caps (or blind flanges) instead of a cap and bottom. The caps and cylindrical section may each include a respective flange assembly (not shown). Each flange assembly may include a flange welded to the cylindrical section 3, a flange welded to the respective cap and bottom, a gasket (not shown), and fasteners (not shown) for connecting the two flanges, such as bolts or studs and nuts. Each flange assembly may be made from any of metals or alloys, discussed above.

A length to diameter ratio of the cylindrical section 3 may range from two to five. A thickness of the cylindrical section wall may be greater than or equal to one-half inch, such as ranging from three-quarters of an inch to three inches. The skirt 10 may be connected to the body 2-4 at or adjacent to a knuckle 5, such as by welding.

Figure 2A:
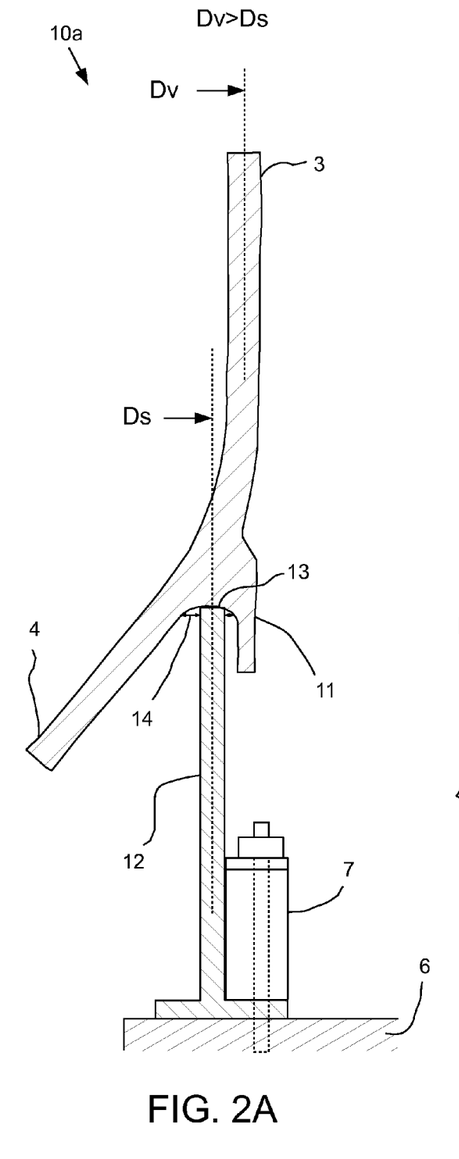
FIGS. 2A-2C illustrate skirts for the coke drum, according to other embodiments of the present invention.
Figure 2B:
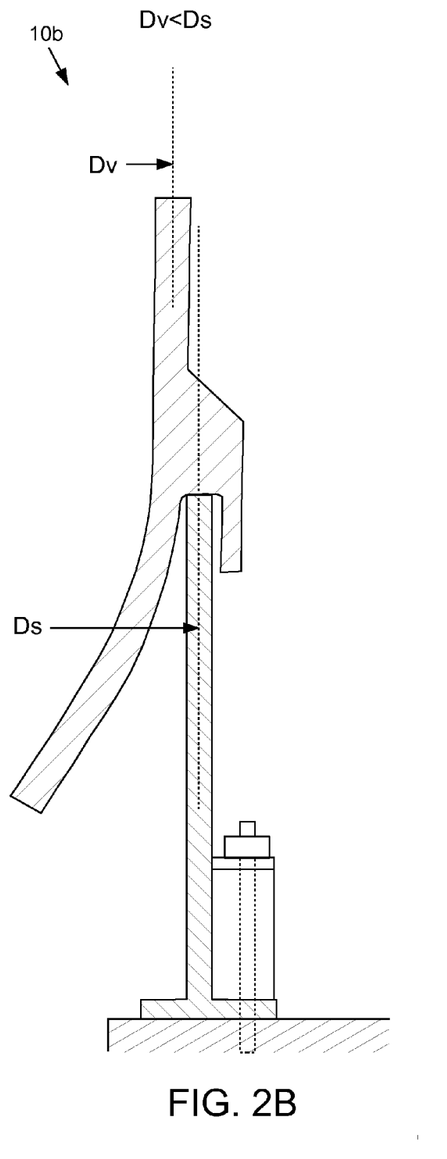
Figure 2C:
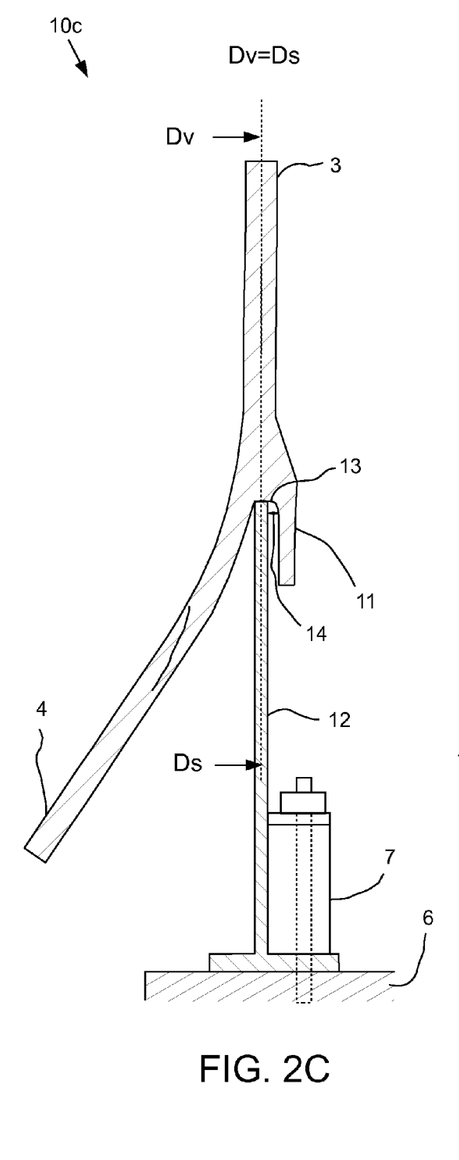

FIGS. 2A-2C illustrate skirts 10*a-c* for the coke drum 1, according to other embodiments of the present invention. Each skirt 10*a-c* may include a hip 11 and a leg 12. Each of the hip 11 and leg 12 may be a ring (or segmented approximation thereof, see FIG. 4). The hip 11 may be formed integrally with or welded to the body 2-4 at or adjacent to the knuckle 5. Alternatively, the hip 11 may be fastened to the body 2-4. The leg 12 may be connected to a foundation 6 (i.e., footing or slab) via anchors, such as chairs 7 (only one shown). The leg 12 may be fastened to each chair 7. The hip 11 may have a profile, such as a cup 13, formed in a lower surface thereof for receiving an upper portion of the leg 12. The hip 11 may be supported by resting on the leg 12, such that the body 2-4 retains at least limited freedom to thermally expand and contract. The hip cup 13 may be oversized relative to the leg upper portion, thereby forming a radial clearance 14 therebetween. The radial clearance 14 may accommodate the thermal cycling of the body 2-4. The hip 11 may be located about the knuckle 5 such that a mid-wall diameter Dv of the cylindrical section 3 is greater than, less than, or equal to a mid-wall diameter Ds of the skirt leg upper portion.

Figure 2D:
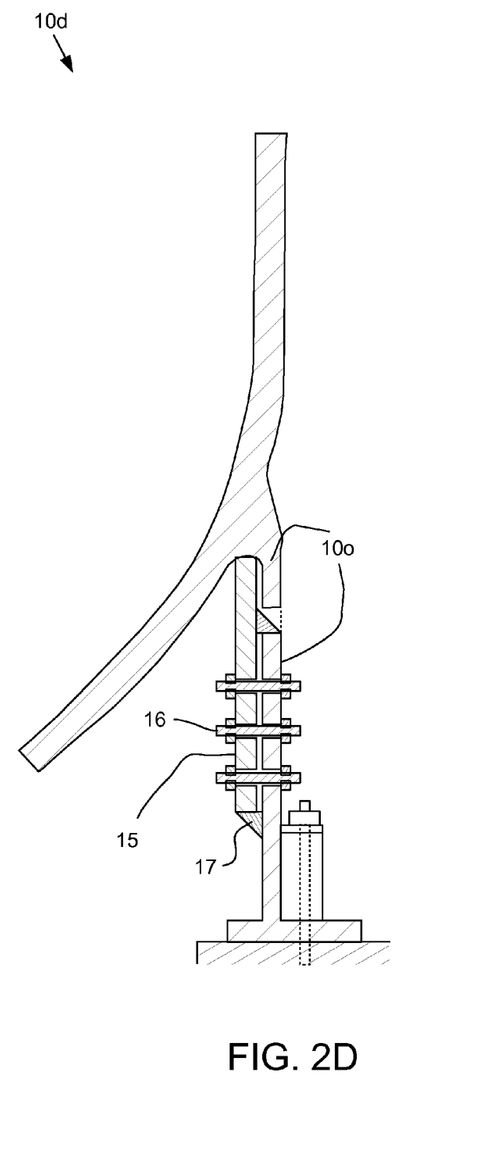
FIG. 2D illustrates a retrofit skirt for the coke drum, according to another embodiment of the present invention.

FIG. 2D illustrates a retrofit skirt 10*d* for a coke drum having a conventional skirt 10*o*, according to another embodiment of the present invention. The retrofit skirt 10*d* may be made using the conventional skirt 10*o*. The conventional skirt 10*o* may be disconnected from the foundation 6. The coke drum may be lifted and suspended. A lower portion of the conventional skirt 10*o* may then be severed from an upper portion of the skirt, thereby forming the retrofit hip. An adapter 15 may then be fastened 16 or welded 17 to the severed lowered portion, thereby forming the retrofit leg. The adapter 15 may have a diameter less than the conventional skirt in order to correspond to the retrofit hip. The retrofit leg may then be reconnected to the foundation 6. The coke drum may then be lowered onto the retrofit leg such that the adapter 15 engages the profile of the retrofit hip, thereby supporting the coke drum.

Alternatively, instead of adapting the severed lowered portion, a new leg may be constructed having the diameter of the adapter 15.

Figure 3A:
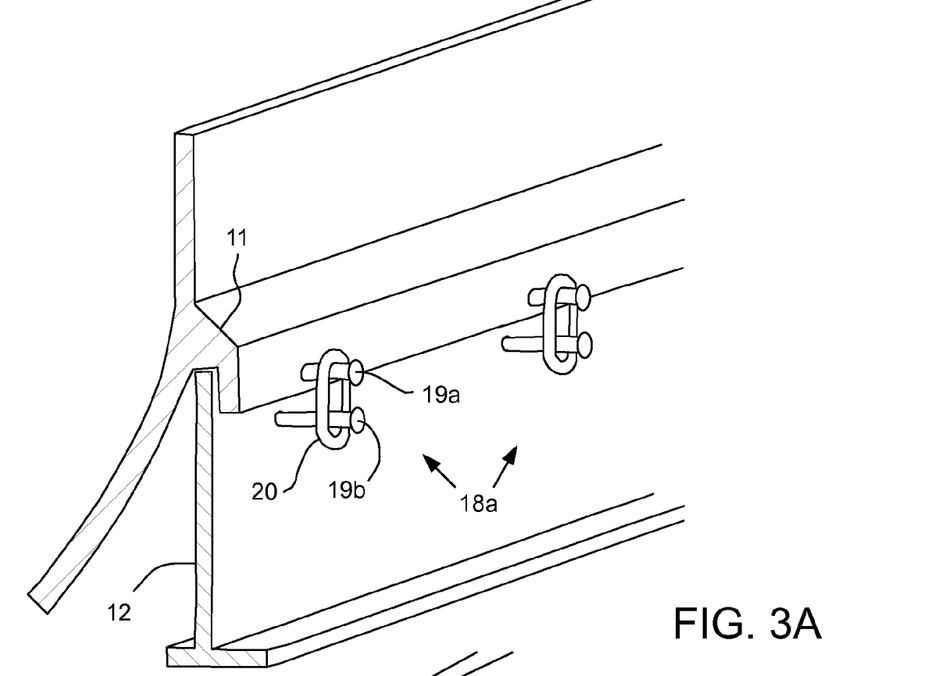
FIGS. 3A-3C illustrate restraints for the skirts, according to other embodiments of the present invention.
Figure 3B:
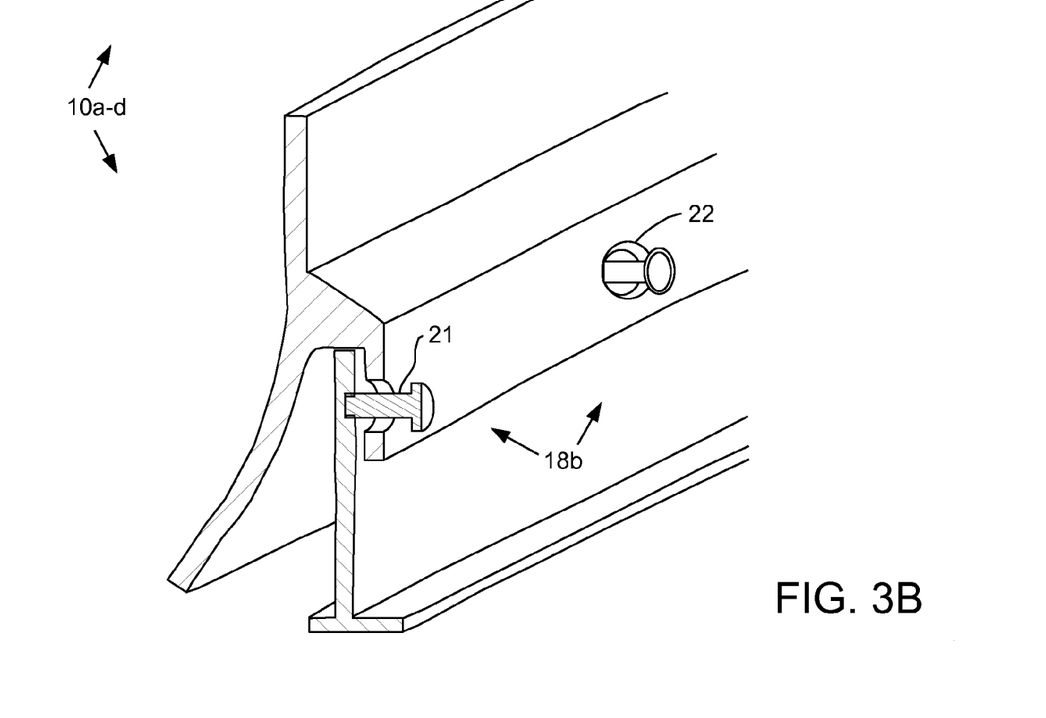
Figure 3C:
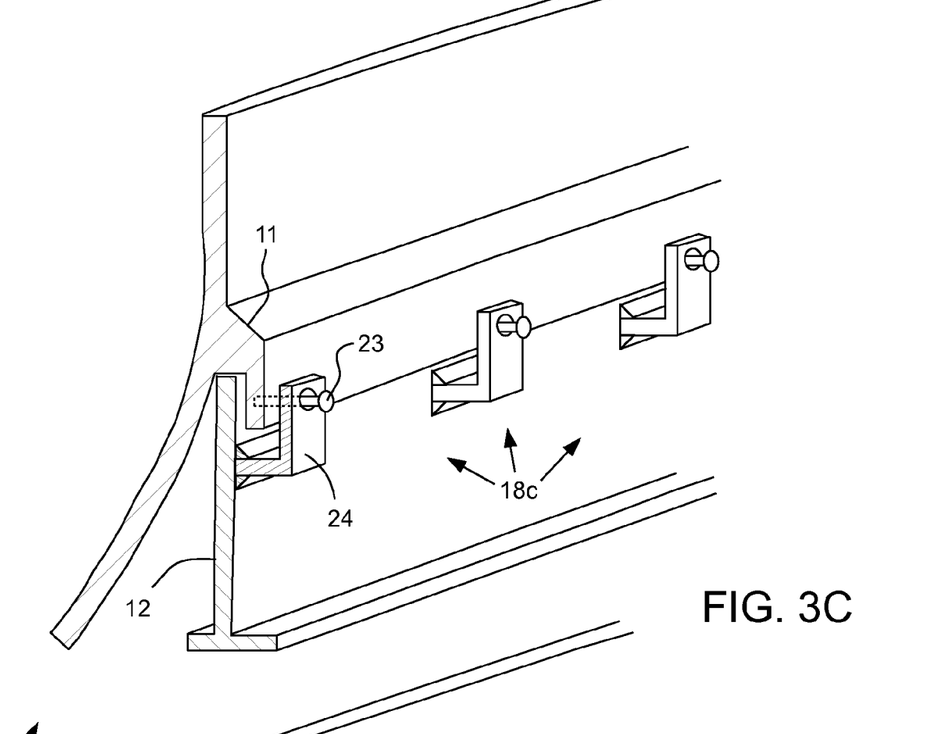

FIGS. 3A-3C illustrate restraints 18*a-c* for the skirts 10*a-d*, according to other embodiments of the present invention. Any of the skirts 10*a-d* may further include any of the restraints 18*a-c*. The restraints 18*a-c* may further connect the hip 11 and the leg 12 to secure the body 2-4 against toppling due to wind loading. The restraints 18*a-c* may also provide for at least limited freedom of the body 2-4 to thermally expand and contract. Each restraint 18*a-c* may include sets of members spaced around the hip 11 and the leg 12.

Each set of the first restraint 18*a* may include a pair of fasteners, such as bolts 19*a,b*, one bolt 19*a* connected to the hip 11 and another bolt 19*b* connected to the leg 12. The bolt connections may be welded or threaded. The bolt pair 19*a,b* may be connected by a band 20 to accommodate the radial movement between the hip 11 and the leg 12 while preventing vertical separation of the bolt pair 19*a,b*.

Each set of the second restraint 18*b* may include a fastener, such as a bolt 21, connected to the leg 12, such as by a threaded connection, and a keyhole 22 formed through an outer wall of the hip 11. A shaft of the bolt 21 may extend through the keyhole 22. The keyhole diameter may be substantially greater than the bolt shaft diameter to accommodate radial movement between the hip 11 and the leg 12 while preventing relative vertical separation therebetween.

Each set of the third restraint 18*c* may include a fastener, such as a bolt 23, connected to the hip 11, such as by a threaded connection, and a bracket 24 connected to the leg 12, such as by a weld. The bracket 24 may have a keyhole formed through an outer portion thereof. A shaft of the bolt 23 may extend through the keyhole. The keyhole diameter may be substantially greater than the bolt shaft diameter to accommodate radial movement between the hip 11 and the leg 12 while preventing relative vertical separation therebetween.

Figure 4:
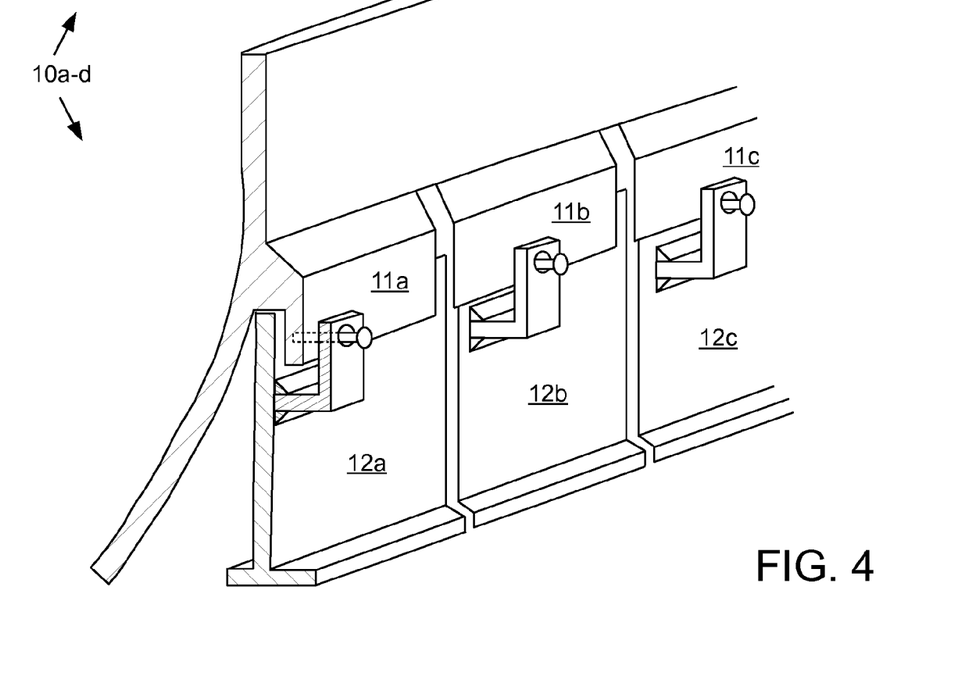
FIG. 4 illustrates a segmented skirt, according to another embodiment of the present invention.

FIG. 4 illustrates a segmented skirt, according to another embodiment of the present invention. Any of the skirts 10*a-d* may include a segmented 11*a-c* hip and/or a segmented leg 12*a-c*.

FIGS. 5A-5D illustrates bearings 30*a-d* for the skirts 10*a-d*, according to other embodiments of the present invention. The bearings 30*a-d* may minimize abrasion to the hip and/or leg resulting from the radial movement therebetween. Any of the skirts 10*a-d* may further include any of the bearings 30*a-d*.

Figure 5A:
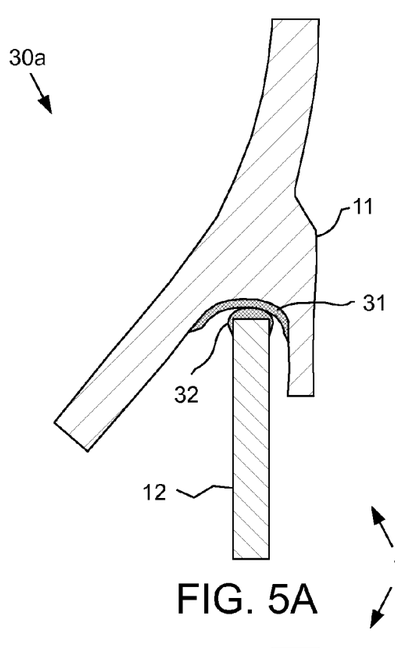
FIG. 5A-5D illustrates bearings for the skirts, according to other embodiments of the present invention.

A first bearing 30*a* may include a liner 31 coating the hip cup 13 and a tip 32 coating a top of the leg 12. Each of the liner 31 and the tip 32 may be made from an abrasion resistant material, such as Babbitt metal, ceramic, ceramic-metal composite (aka cermet), bi-metal, or lubricant infused alloy composite. The liner 31 and tip 32 may be made from the same or different material. If different, the liner material may be harder than the tip material and the tip may be made from a softer abrasion resistant material or a sacrificial material, such as a soft metal or alloy. The abrasion resistant material may be thermally insulative or conductive. If metallic, the liner 31 and tip 32 may be welded onto the respective hip cup 13 and leg top. If ceramic, the liner 31 and tip 32 may be painted and cured or thermally sprayed onto the respective hip cup 13 and leg top. Alternatively, the bearing 30*a* may include only either one of the liner 31 and the tip 32.

Figure 5B:
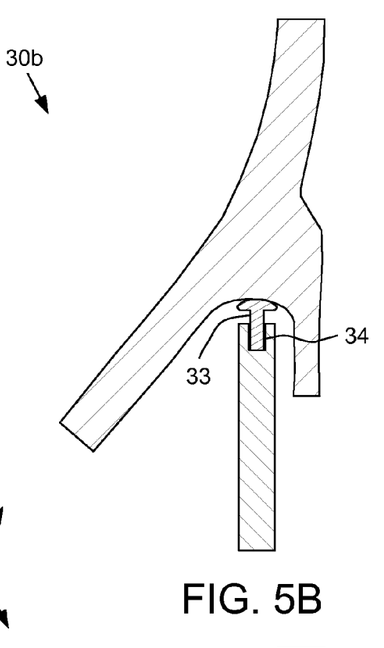

A second bearing 30*b* may include a tip 33 received in a groove 34 formed in a top of the leg 12 and may or may not include the liner (not shown) coating the hip cup 13. The tip 33 may be a ring or (or segmented approximation thereof) depending on the leg 12. The tip 33 may form a sliding or interference fit with the groove 34. The tip 33 may be made from the abrasion resistant material.

Figure 5C:
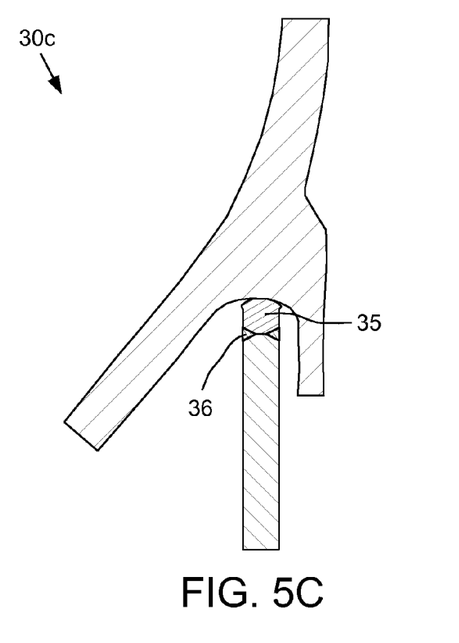

A third bearing 30*c* may include a tip 35 welded 36 to a top of the leg 12 and may or may not include the liner (not shown) coating the hip cup 13. The tip 35 may be a ring or (or segmented approximation thereof) depending on the leg 12. The tip 33 may be made from one of the metallic abrasion resistant materials.

Figure 5D:
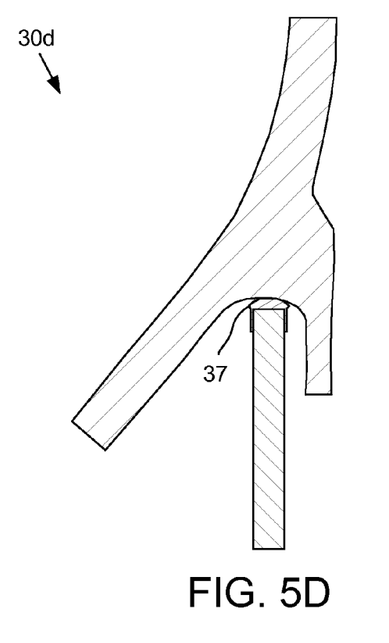

A fourth bearing 30*d* may include a cap 37 disposed on a top of the leg 12 and may or may not include the liner (not shown) coating the hip cup 13. The cap 37 may be a ring or (or segmented approximation thereof) depending on the leg 12. The cap 37 may form a sliding or interference fit with the leg 12. The cap 37 may be made from the abrasion resistant material.

While the foregoing is directed to embodiments of the present invention, other and further embodiments of the invention may be devised without departing from the basic scope thereof, and the scope thereof is determined by the claims that follow.

The invention claimed is:

1. A pressure vessel, comprising:
    a body comprising a cylindrical section; and
    a skirt comprising a hip, a leg, and a restraint:
        the hip formed with or attached to the body and having a profile for receiving an upper portion of the leg to support the body by simply resting on a top of the leg,
        the profile being oversized relative to the leg upper portion, thereby defining a radial clearance between the hip and the leg to account for thermal cycling of the body, and
        the restraint independently coupling the hip to an outer surface of the leg while allowing limited movement between the hip and the leg to account for the thermal cycling and to secure against toppling of the body.

2. The pressure vessel of claim 1, wherein a mid-wall diameter of the cylindrical section is greater than a mid-wall diameter of the leg upper portion.

3. The pressure vessel of claim 1, wherein a mid-wall diameter of the cylindrical section is less than a mid-wall diameter of the leg upper portion.

4. The pressure vessel of claim 1, wherein a mid-wall diameter of the cylindrical section is equal to a mid-wall diameter of the leg upper portion.

5. The pressure vessel of claim 1, wherein the restraint comprises a pair of fasteners connected to the hip and the leg and a band connecting the fasteners.

6. The pressure vessel of claim 1, wherein the restraint comprises a fastener connected to the leg and having a shaft portion extending through a keyhole formed through an outer wall of the hip.

7. The pressure vessel of claim 1, wherein the restraint comprises:
    a bracket welded to the leg, and
    a fastener connected to the hip and having a shaft portion extending through a keyhole formed through an outer portion of the bracket.

8. The pressure vessel of claim 1, wherein the hip and the leg are each rings.

9. The pressure vessel of claim 1, wherein the hip and the leg each comprise a plurality of ring segments.

10. The pressure vessel of claim 1, further comprising a bearing disposed between the hip and the leg.

11. The pressure vessel of claim 10, wherein the bearing comprises at least one of:
    an abrasion resistant coating on the profile, and
    an abrasion resistant coating on the top edge of the leg.

12. The pressure vessel of claim 10, wherein the bearing comprises a tip made from an abrasion resistant material and disposed in a groove formed in the top edge of the leg.

13. The pressure vessel of claim 10, wherein the bearing comprises a tip made from an abrasion resistant material and welded to the top edge of the leg.

14. The pressure vessel of claim 10, wherein the bearing comprises a cap made from an abrasion resistant material and disposed on the top edge of the leg.

15. A pressure vessel, comprising:
    a body comprising a cylindrical section; and
    a skirt comprising a hip, a leg, and a restraint:
        the hip formed with or attached to the body and having a profile for receiving an upper portion of the leg,
        the profile being oversized relative to the leg upper portion, thereby defining a radial clearance between the hip and the leg to account for thermal cycling of the body, and
        the restraint fastening the hip and the leg while allowing limited movement between the hip and the leg to account for the thermal cycling,
    wherein a mid-wall diameter of the cylindrical section is equal to a mid-wall diameter of the leg upper portion.

16. A pressure vessel, comprising:
    a body comprising a cylindrical section; and
    a skirt comprising a hip, a leg, and a restraint:
        the hip formed with or attached to the body and having a profile for receiving an upper portion of the leg,
        the profile being oversized relative to the leg upper portion, thereby defining a radial clearance between the hip and the leg to account for thermal cycling of the body, and
        the restraint fastening the hip and the leg while allowing limited movement between the hip and the leg to account for the thermal cycling,
    wherein the restraint comprises a fastener connected to the leg and having a shaft portion extending through a keyhole formed through an outer wall of the hip.

17. A pressure vessel, comprising:
    a body comprising a cylindrical section; and
    a skirt comprising a hip, a leg, and a restraint:
        the hip formed with or attached to the body and having a profile for receiving an upper portion of the leg,
        the profile being oversized relative to the leg upper portion, thereby defining a radial clearance between the hip and the leg to account for thermal cycling of the body, and
        the restraint fastening the hip and the leg while allowing limited movement between the hip and the leg to account for the thermal cycling,
    wherein the restraint comprises:
        a bracket welded to the leg, and
        a fastener connected to the hip and having a shaft portion extending through a keyhole formed through an outer portion of the bracket.

18. A pressure vessel, comprising:
    a body comprising a cylindrical section;
    a skirt comprising a hip, a leg, and a restraint:
        the hip formed with or attached to the body and having a profile for receiving an upper portion of the leg,
        the profile being oversized relative to the leg upper portion, thereby defining a radial clearance between the hip and the leg to account for thermal cycling of the body, and
        the restraint fastening the hip and the leg while allowing limited movement between the hip and the leg to account for the thermal cycling; and
    a bearing disposed between the hip and the leg.

19. A pressure vessel, comprising:
    a body comprising a cylindrical section;
    a skirt comprising a hip and a leg:
        the hip formed with or attached to the body and having a profile for receiving an upper portion of the leg to support the body by simply resting on a top of the leg, and
        the profile being oversized relative to the leg upper portion, thereby defining a radial clearance between the hip and the leg to account for thermal cycling of the body; and a bearing disposed between the hip and the leg and comprising at least one of:
   an abrasion resistant coating on the profile,
   an abrasion resistant coating on the top of the leg,
   a tip made from an abrasion resistant material and disposed in a groove formed in the top of the leg,
   a tip made from an abrasion resistant material and welded to the top of the leg, and
   a cap made from an abrasion resistant material and disposed on the top of the leg.

* * * * *

UNITED STATES PATENT AND TRADEMARK OFFICE
CERTIFICATE OF CORRECTION

PATENT NO. : 8,905,260 B2
APPLICATION NO. : 13/674418
DATED : December 9, 2014
INVENTOR(S) : Mahmod Samman Page 1 of 1

It is certified that error appears in the above-identified patent and that said Letters Patent is hereby corrected as shown below:

Claims:

Column 5, Claim 1, Lines 7-8, please delete "receiving an upper portion of the leg to support the body by simply resting on a top of the leg," and insert --receiving an upper portion of the leg, the leg having a top edge, the full weight of the body supported by the top edge when the hip rests upon the top edge,-- therefor;

Column 6, Claim 19, Lines 61-62, please delete "receiving an upper portion of the leg to support the body by simply resting on a top of the leg," and insert --receiving an upper portion of the leg, the leg having a top edge, the full weight of the body supported by the top edge when the hip rests upon the top edge,-- therefor;

Column 7, Claim 19, Line 4, please insert --edge-- after top;

Column 7, Claim 19, Line 6, please insert --edge-- after top;

Column 7, Claim 19, Line 8, please insert --edge-- after top;

Column 7, Claim 19, Line 10, please insert --edge-- after top.

Signed and Sealed this
Nineteenth Day of May, 2015

Michelle K. Lee
*Director of the United States Patent and Trademark Office*